Jan. 1, 1957  G. P. LEISTENSNIDER  2,776,154
PLASTIC PACKING
Filed Dec. 30, 1952
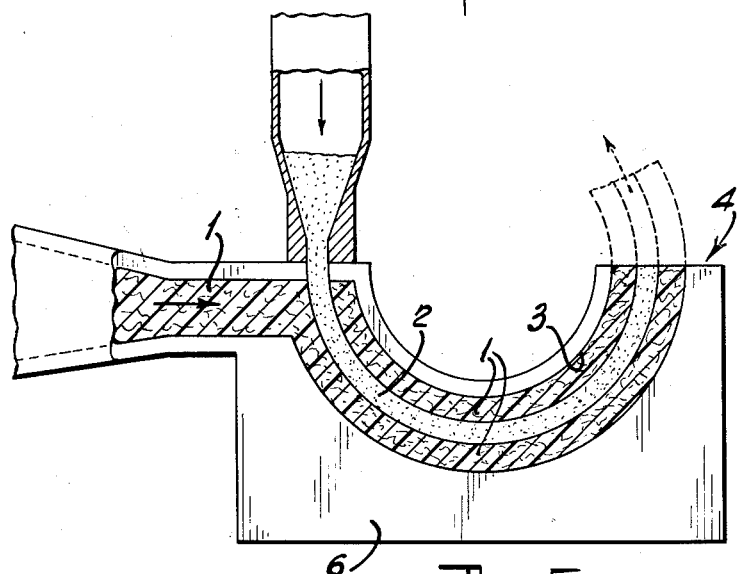
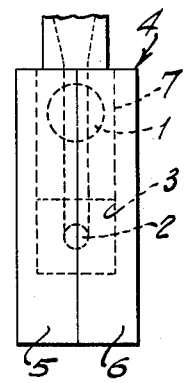
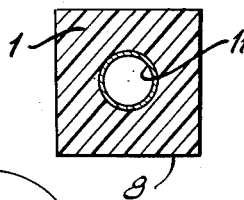
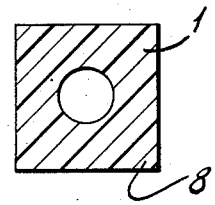
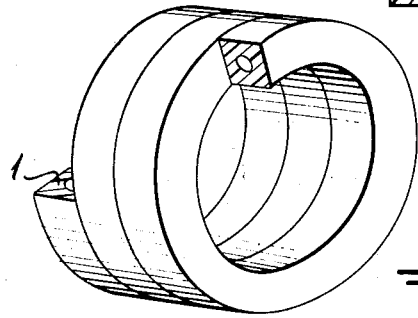
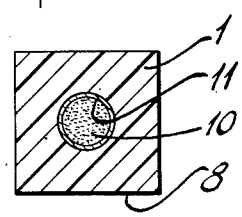
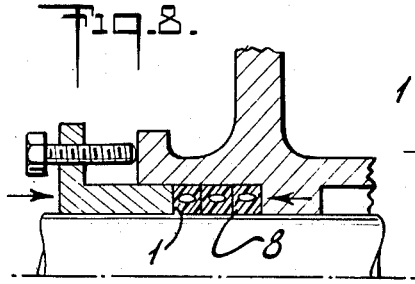
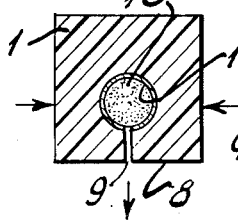
INVENTOR
GEORGE P. LEISTENSNIDER
BY Virgil C. Kline
ATTORNEY United States Patent Office 2,776,154
Patented Jan. 1, 1957

2,776,154

PLASTIC PACKING

George P. Leistensnider, Somerville, N. J., assignor to Johns-Manville Corporation, New York, N. Y., a corporation of New York Application December 30, 1952, Serial No. 328,627

11 Claims. (Cl. 288—8)

This invention relates to packings and more particularly to improvements in packings of the type known generally in the art as "plastic" packings, having particular utility for application to shafts rotating at high speeds. Such packings conventionally are composed of fibers, such as asbestos, a flexible, resilient, heat-resistant binder, and a dry lubricant, mixed and extruded in the form of a helical strip of the desired cross-sectional shape, from which lengths may be cut to form rings of a desired size, the ends of the strip forming a butt joint in the ring. Since the rings are usually employed in sets, the strip is preferably given a square or rectangular cross-sectional shape. A vulcanizing compound may be included in the mixture, and the extruded product vulcanized, if desired, depending upon the properties required in the final packing.

It has previously been proposed to provide packings composed of various conventional packing materials, including rubber, woven fabric reinforced laminated materials, etc., in various cross-sectional shapes, including square or rectangular and round, with an internal opening or openings extending longitudinally of the packing body, which openings also have been made of various shapes in cross-section. It has further been recognized that the use of arched openings within the packing body will increase resilience and flexibility, and expansibility transversely to the direction in which the arch extends, this transverse direction being usually in a sealing direction, so that sealing effectiveness is increased while the amount of packing material required in a packing of given cross-sectional dimensions is reduced. It has, however, always been considered that plastic packings of the type mentioned heretofore would not perform satisfactorily if made to include such openings, because by their nature it has been expected that the arch construction would not be maintained either in the manufacturing process or in service but would instead collapse. This has appeared inevitable in view of the soft extrudable nature of the packing mixture and the tendency of the final packing to "extrude" in service, rather than maintain its sealing position and effectiveness properly. This tendency, particularly evident when the packing is not vulcanized, suggests that the packing material would merely extrude into any internal opening of the type described. I have found, however, that the internal opening and arch construction can be effectively incorporated in "plastic" packings in accordance with my invention as hereinafter described without the expected failure of the walls of the arch-providing aperture, even in the unvulcanized form and under high service pressures.

It has also been proposed to provide a reservoir of lubricant in a packing for release in service by encasing a proper lubricant in a Babbitt metal packing body or casing, the casing having a slit in its inner wall to let grease escape to the rod to which the packing is applied.

It has further been suggested that a dry, flakey lubricator may be stored in the interior of a packing in an opening having its walls composed of some readily combustible material, surrounded by the packing body, which may comprise woven asbestos cloth. The lubricant in this type of packing escapes from the unjoined open ends of the annular packing tube at their butt joint. When the combustible material burns away in service the lubricant may also penetrate the body of the packing.

To provide a sufficient amount of lubricant in "plastic" packings has always posed a problem because the lubricant, if present in too high amounts, attacks the binder, if it is of a type which is not resistant to deterioration by the lubricant, and because of its adverse effect on the structural characteristics of the packing. For these reasons, and because it has not been considered feasible to employ a hollow, arched construction whereby a reservoir of lubricant could be incorporated in "plastic" packings, the known expedients for storing sizable quantities of lubricant in other types of packing have not heretofore been utilized in "plastic" packings.

There have also been proposals to incorporate various resilient materials as core materials in various types of packings composed of various packing materials, in order to increase the resilience of the packing, but again this has not been considered practical in the case of "plastic" packings, partly because of the failure to recognize that the hollow, arched construction could be employed successfully in this type of packing.

Since it would be desirable to obtain the benefits of the above expedients in "plastic" packings, one object of this invention is to provide a packing of the type referred to having increased resilience, flexibility, and expansibility in a lateral or sealing direction or in a direction toward the shaft to which the packing is applied. It is a particular object of the invention to obtain these advantages because "plastic" packings are conventionally employed in sets or stacks, in which it is difficult to obtain uniform sealing of all rings of the set. The properties sought obviously would obviate this difficulty considerably.

Another object of the invention is to provide a "plastic" packing having more consistent sealing effectiveness throughout its life, improved dimensional stability, improved fiber orientation, more uniform density, a lower percent compression and hence a longer life, requiring a shorter break-in period, requiring fewer gland adjustments, having the facility of accommodating swell in the material, and having less sensitivity to gland take-up so as to reduce the tendency of the packing to seize against the shaft and burn after the gland has been adjusted to take-up.

Another object of the invention is to reduce the amount of packing material required in a "plastic" packing of a given size and shape in cross-section, without sacrificing resilience, wearing properties, sealing effectiveness, and general performance standards of the packing in service.

A still further object of the invention is to provide means for greatly increasing the amount of lubricant available in a plastic packing and means for gradually releasing the lubricant in service.

Other objects of my invention will become apparent from the following detailed description, taken in conjunction with the accompanying drawings forming a part of this specification and in which:

Fig. 1 is a side view in partial section showing an extrusion nozzle employed in making packings comprising the instant invention;

Fig. 2 is an end elevation of the device shown in Fig. 1, looking in the direction of the arrow at the left of the figure;

Fig. 3 is a view in perspective of a helical coil of the novel packing;

Fig. 4 is a cross-sectional view of a novel packing having a hollow center;

Fig. 5 is a cross-sectional view of a novel hollow packing similar to that shown in Fig. 4 but having a material lining the inner surface of the wall of the opening;

Fig. 6 is a sectional view of a similar novel packing having a material lining the inner surface of the wall of the opening and the opening filled with a lubricant or other readily extrudable material;

Fig. 7 is a cross-sectional view of a similar novel hollow packing having a material lining the inner surface of the wall of the opening, the opening being located off-center in the sealing (radial) direction, and the wall of the hole on the sealing side being slit inwardly to the lining; and Fig. 8 is a side view in partial section showing a set or stack of the novel packings applied to a shaft in a stuffing box and having central apertures of an oval or elongated shape in cross-section, the elongation being in the direction of the width of the rings and the length of the shaft.

"Plastic" packings of the type with which the instant invention is concerned comprise fiber in amounts of approximately 10%–80% of the weight of the packing mixture. Chrysotile asbestos fibers are preferred, though other types of asbestos fibers, glass, rayon, cotton, flax, or other mineral, vegetable or synthetic fibers could be employed. Mixtures of the enumerated fibers could also be used. The fibers are usually of rather short length but long enough to provide reinforcement in order to counteract extrusion of the packing under pressure and aid in its retention of shape. The packing material comprises further a flexible, resilient, heat-resistant binder that will retain its resilience under operative conditions which may involve high temperatures and to some extent high pressures. Such binders may be present in proportions of about 5–30% of the weight of the mixture, including vulcanizing compounds in amounts up to about 40% of the weight of the binder or about 12% of the weight of the mixture, if the packing is to be vulcanized. Examples of a suitable binder are chloroprene, butadiene acrylonitrile, a polyacrylic ester, silicone, vinyl chlorides or vinyl acetates, or any of the other flexible, resilient, heat-resistant and vulcanizable or polymerizable binders well known in the art. Preferred binders are neoprenes and nitriles. The packing material of the instant invention comprises dry lubricant in amounts of about 10%–70% of the weight of the mixture. The lubricant used is in small particle size, flake or powdered form, and may comprise graphite, mica, certain metals such as lead, zinc, copper, brass, antimony, tin, or silver, or any non-fluid lubricating substance of high melting point, in the order of 300° F. and up. The lubricant may be a mixture of any of the above in any proportion.

A typical example of the amounts of binder, fiber, and dry lubricants of the type described would be 20% binder, including as part of the binder, if desired, about 4% vulcanizing compounds, 35% fiber, and 45% dry lubricant, all by weight, based on the mixture.

Materials in amounts such as described above are thoroughly mixed and extruded to form the body of the packing of my invention. Conventionally, "plastic" packings of this type are extruded through a semi-circular nozzle having an opening of the desired cross-sectional shape, usually square or rectangular. As the packing comes from the nozzle in strip form, it tends to assume a helical shape coiled upon itself, and may be wound upon a mandrel, from which desired lengths of the packing may be cut as required.

In accordance with the instant invention, a hollow "plastic" packing is formed as shown in Figs. 1 and 2, by extruding the plastic material 1 that is to form the body of the packing about a pin 2 located within the semi-circular extrusion nozzle 3. The nozzle 3 is supported in any convenient manner, as in the block shown generally at 4 and comprising the two complementary sections 5 and 6 which in assembled relation provide a notch or seat 7 for receiving the nozzle. The pin 2 extends lengthwise of the nozzle and is curved in a manner corresponding to the curvature of the nozzle. The shape of the pin in cross-section determines the shape of the opening in the packing, and may desirably be circular. However, it is not necessary that the cross-sectional shape of the pin and resulting opening in the packing be circular, the main requirement being that the pin be so shaped as to result in the production of a longitudinally extending aperture in the packing strip, with the inner surface of the wall defining the aperture being curved or arched outwardly in the direction of the width of the strip, so as to provide opposed outwardly directed arches in the packing. These arches may be round, as shown in Figs. 1–7, or oval or formed as the extremities of an aperture elongated in the direction of the arches, as shown in Fig. 8, but it is essential that they extend axially of the shaft to which the packing is applied; i. e., in the direction in which the gland pressure is to be exerted, shown by the direction of the arrows in Fig. 8 and also in Fig. 7.

The aperture in the packing need not be formed directly in the center, as viewed in cross-section, but may be displaced radially toward the shaft or sealing side 8 of the packing as shown in Fig. 7, this resulting in a reduction in thickness of the packing wall next to the shaft and facilitating expansion in that direction. The location of the aperture, as well as its size and shape, can obviously be readily controlled by the location, size, and shape given the pin in the extrusion nozzle. It is also possible to further weaken the wall of the packing next to the rod by slitting that wall longitudinally and radially inwardly, as shown in Fig. 7 at 9. Such a slit is advantageous in performing an additional function to be discussed hereinafter.

The curved arch construction described imparts resilience to the packing, and, where the arch is omitted in the sealing or transverse direction, and/or the wall is weakened in that direction, as by making it thinner or by slitting it, expansibility in the sealing direction is increased.

The size of the internal aperture may be large enough to represent 50% or more of the cross-sectional area of the packing, but for effectiveness should not be smaller than about 15% of the cross-sectional area. A satisfactory aperture size has been found to be a 5/16" round aperture in a 5/8" square packing.

A resilient or lubricating core material 10 may conveniently be placed in the aperture in the packing body by making the pin in the extrusion nozzle hollow as shown in Figs. 1 and 2 and extruding the core material through the hollow pin simultaneously with the extrusion of the plastic material 1 forming the packing body through the portion of the nozzle surrounding the pin. Such a core material may comprise grease, rubber, a mixture of rubber and fiber, sponge rubber, or other readily extrudable material. In the case of sponge rubber, the sponge rubber may be either preformed or extruded in unvulcanized condition and vulcanized after extrusion to create the sponge effect. A suitable grease is any non-fluid or semi-fluid grease, which desirably should not flow at room temperatures and preferably should have a flow point above approximately 100° F.

The filling of the opening in the packing with a core material of the type described not only adds to the resilience of the packing but, in the case of grease, provides a reservoir of lubricant.

It has been found highly desirable to apply a thin plastic impervious film as shown at 11 in Figs. 5–7 of a substantially non-soluble material such as vinyl chloride or other largely non-soluble material as a lining for the walls of the aperture in the packing, especially in those instances where the aperture is to be filled with grease and the packing material is particularly subject to deterioration by grease, as where it has a high rubber content. When a film of this type is employed, it must be applied after the extruded packing has been dried and vulcanized, if vulcanization is contemplated; otherwise the elevated temperatures encountered in such processing would destroy the film. The film can be formed on the walls of the aperture by passing a solution of vinyl chloride or the like through the aperture, leaving a thin film on the walls of the aperture, which upon fluxing becomes impervious and also increases the natural resilience of the arched construction. If grease is to be used in the aperture, the lubricant can simply be pumped into the aperture, the vinyl chloride or similar lining preventing the grease from being released in the body of the packing prior to service. When grease is employed with the lining, it escapes in service at the butt joint through the open ends of the packing annulus, but the grease is also made available through the packing body when the film is destroyed under the heat of the sealing temperatures encountered in service. In the construction shown in Fig. 7, the grease may escape through the slit 9 upon the destruction or rupture of the film, thus providing a more positive and direct lubricating action. The manner of filling the aperture by pumping may also be used when rubber or other materials which may be induced into the hole by a pumping action are to be employed as the core material. The vinyl chloride film performs an additional function in insuring that the packing will not split when the grease or other material is pumped into the aperture.

Quite unexpectedly, "plastic" packings formed as described above, whether vulcanized or unvulcanized, exhibit the advantages set forth in the statement of objects. The extrusion of the mixture forming the packing body about the pin in the extrusion nozzle tends to orient the fibers in the desired (longitudinal) direction, thus improving its strength and resistance to localized ruptures from flexing of the strip. The pin in the nozzle also improves the dimensional stability of the packing by putting more pressure on a smaller cross-section in the extrusion process. This increased pressure is also more uniformly distributed, and results in a more uniform density in the packing.

Other specific advantages obtained pursuant to my stated objectives are demonstrated by the results of 1,000-hour comparison tests involving the hollow plastic packings of the instant invention and the conventional plastic packings of solid cross-section. Specifically, the test results showed that the hollow plastic packing:

(1) Provides more consistent sealing effectiveness throughout the 1,000-hour test;
(2) Required fewer gland adjustments, at longer service intervals;
(3) Required a shorter break-in period, apparently because the pressure caused by the swelling of the material (always a problem with this type of packing) was relieved by the aperture;
(4) Showed less sensitivity to gland take-up in that it did not so readily seize and burn after applications of the gland take-up;
(5) Showed a lower percent compression (7%, as against 19% for the plastic packing having a solid cross-section), indicating a longer life for the hollow packing; and
(6) After tests, showed less wear, a smoother worn surface, and a much better general appearance than the standard packing of solid cross-section.

It will thus be seen that the objects of my invention have been attained, whereby the versatility and effectiveness of the type of packings known generally as "plastic" packings have been greatly increased.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. A packing of the composition and type generally known as "plastic" packing and extruded in the form of a helical strip from which suitable lengths may be taken and applied in helical, or annular, form to a movable shaft with the length of the strip extending generally circumferentially of the shaft, its width extending generally axially of the shaft, and its thickness extending generally radially of the shaft, said packing comprising an extruded annular "plastic" strip comprising, by weight, fiber in amount within the approximate range 10%–80%, resilient, flexible, heat-resistant binder in amount within the approximate range 5%–30%, and non-fluid lubricating substance in the form of small particles in amount within the approximate range 10%–70%, said fiber, binder, and lubricating substance being thoroughly intermixed, said strip having an internal aperture extending in the direction of its length and hence circumferentially thereof and of the shaft as the strip is applied thereto, the inner surface of the wall defining the aperture being arched outwardly in the direction of the width of the strip and hence axially of the shaft as the strip is applied thereto, the size of the aperture being at least about 15% of the cross-sectional area of the strip, said fibers being predominately oriented generally longitudinally of the strip.

2. A packing as defined in claim 1, in which said aperture contains a readily extrudable material.

3. A packing as defined in claim 2, in which the extrudable material is a lubricant.

4. A packing as defined in claim 2, in which the extrudable material is also resilient.

5. A packing as defined in claim 1, in which the inner surface of the wall of the aperture carries a lining of plastic material.

6. A packing as defined in claim 5, in which the aperture contains a readily extrudable material within said lining.

7. A packing as defined in claim 6, in which the material comprising said lining is substantially non-soluble in grease and in which the lining is impervious to the passage of grease, and in which the aperture contains grease within said lining.

8. A packing as defined in claim 7, in which the material of said lining comprises vinyl chloride.

9. A packing as defined in claim 5, in which said lining comprises vinyl chloride.

10. A packing as defined in claim 1, in which the aperture contains grease having a flow point above room temperature and the wall defining the aperture has a narrow slit extending therethrough from the aperture in a sealing direction.

11. A packing as defined in claim 10, in which the slit inner surface of the wall defining the aperture carries a lining of material substantially non-soluble in the grease and being normally impervious to the passage of the grease, but destructible at the elevated temperatures encountered in service.

References Cited in the file of this patent

UNITED STATES PATENTS

| | | |
|---|---|---|
| 1,018,202 | Mastin | Feb. 20, 1912 |
| 1,119,803 | Brown | Dec. 8, 1914 |
| 1,150,050 | Mastin | Aug. 17, 1915 |
| 1,172,543 | Mastin | Feb. 22, 1916 |
| 1,182,294 | Miller | May 9, 1916 |
| 1,356,393 | Nolte | Oct. 19, 1920 |
| 1,674,839 | Rhodes | June 26, 1928 |
| 2,052,762 | Gits | Sept. 1, 1936 |
| 2,072,536 | Trickey et al. | Mar. 2, 1937 |
| 2,116,277 | Meerbeck | May 3, 1938 |
| 2,134,324 | Brackett | Oct. 25, 1938 |

(Other references on following page)

UNITED STATES PATENTS

| | | | |
|---|---|---|---|
| 2,210,004 | Rautenstrauch | Aug. 6, | 1940 |
| 2,354,855 | Emanuel | Aug. 1, | 1944 |
| 2,367,882 | McKnight | Jan. 23, | 1945 |
| 2,447,340 | Jackson | Aug. 17, | 1948 |
| 2,459,721 | Poltorak | Jan. 18, | 1949 |

FOREIGN PATENTS

| | | |
|---|---|---|
| 2,142 | Great Britain | of 1903 |

OTHER REFERENCES

"Condensed review of some recently developed materials," published in "Machinery," October 1941, page 147 relied upon. (Copy in Scientific Library and Div. 52.)